(12) United States Patent
Kriegel et al.

(10) Patent No.: US 11,708,454 B2
(45) Date of Patent: Jul. 25, 2023

(54) ACROLEIN SCAVENGING IN PTF AND OTHER 1,3-PROPANEDIOL DERIVED POLYMERS

(71) Applicant: THE COCA-COLA COMPANY, Atlanta, GA (US)

(72) Inventors: Robert M. Kriegel, Decatur, GA (US); Ronald D. Moffitt, Spartanburg, SC (US); Steven F. Sukits, Fayetteville, GA (US); Vidhu Nagpal, Jr., Mars, PA (US); Christopher R. Mubarak, Cumming, GA (US); Marlon Salvador Morales, Clemson, SC (US)

(73) Assignee: THE COCA-COLA COMPANY, Atlanta, GA (US)

( * ) Notice: Subject to any disclaimer, the term of this patent is extended or adjusted under 35 U.S.C. 154(b) by 205 days.

(21) Appl. No.: 16/347,353

(22) PCT Filed: Nov. 3, 2017

(86) PCT No.: PCT/US2017/059877
§ 371 (c)(1),
(2) Date: May 3, 2019

(87) PCT Pub. No.: WO2018/085628
PCT Pub. Date: May 11, 2018

(65) Prior Publication Data
US 2019/0330420 A1   Oct. 31, 2019

Related U.S. Application Data

(60) Provisional application No. 62/416,973, filed on Nov. 3, 2016.

(51) Int. Cl.
| | | |
|---|---|---|
| *C08G 63/90* | (2006.01) | |
| *C08G 63/78* | (2006.01) | |
| *C08J 5/18* | (2006.01) | |
| *C08K 5/17* | (2006.01) | |
| *C08K 5/20* | (2006.01) | |

(52) U.S. Cl.
CPC ............ *C08G 63/90* (2013.01); *C08G 63/78* (2013.01); *C08J 5/18* (2013.01); *C08K 5/17* (2013.01); *C08K 5/20* (2013.01); *C08J 2367/02* (2013.01)

(58) Field of Classification Search
CPC ...... C08G 63/90; C08G 63/78; C08G 63/181; C08L 67/02; C08K 5/17; C08K 5/20
See application file for complete search history.

(56) References Cited

U.S. PATENT DOCUMENTS

| | | |
|---|---|---|
| 6,093,786 A | 7/2000 | Kelsey |
| 6,274,212 B1 | 8/2001 | Rule et al. |
| 6,331,264 B1 | 12/2001 | Kurian et al. |
| 6,632,874 B2 | 10/2003 | Rule et al. |
| 6,680,353 B1 | 1/2004 | Kato et al. |
| 6,762,275 B1 | 7/2004 | Rule et al. |
| 7,524,921 B2 | 4/2009 | Eng et al. |
| 2004/0146674 A1* | 7/2004 | Howell, Jr. ............. C08L 67/02  428/35.7 |
| 2005/0143504 A1 | 6/2005 | Seidel et al. |
| 2006/0183829 A1 | 8/2006 | Fujimoto et al. |
| 2007/0098936 A1* | 5/2007 | Tung ....................... C08K 3/22  428/35.7 |
| 2014/0205786 A1* | 7/2014 | Nederberg .............. C08L 67/06  428/36.92 |

FOREIGN PATENT DOCUMENTS

WO         0102305 A1    1/2001

OTHER PUBLICATIONS

Hirschler, M.M., et al.; Thermal Decomposition of Polymers, 2008, p. 1-112 to 1-143.*
Extended European Search Report for EP 17867773.8, dated May 12, 2020 (7 pp.).
International Search Report and Written Opinion, PCT/US2017/059877, 14 pages, dated Nov. 3, 2017.

* cited by examiner

*Primary Examiner* — Robert S Jones, Jr.
(74) *Attorney, Agent, or Firm* — Eversheds Sutherland (US) LLP

(57) ABSTRACT

This disclosure provides a process for removing acrolein or allyl alcohol from a polyester composition, the process comprising: combining a polyester composition derived from 1,3-propanediol with an amino amide or a primary amine; wherein the amino amide or the primary amine is combined in sufficient quantities to scavenge acrolein or allyl alcohol produced from degradation of the polyester composition. An analysis of reactions between anthranilamide (AAA) and acrolein demonstrates how amines or amino amides can scavenge acrolein from thermally processed poly(trimethylene terephthalate) and poly(trimethylene furan-2,5-dicarboxylate), and thermodynamic models are presented as guidance for matching targets with scavenging agent.

22 Claims, 8 Drawing Sheets

ACROLEIN SCAVENGING IN PTF AND OTHER 1,3-PROPANEDIOL DERIVED POLYMERS

CROSS REFERENCE TO RELATED APPLICATIONS

This application a 35 U.S.C. § 371 National stage application of International Patent Application No. PCT/US2017/059877, filed Nov. 3, 2017, which claims the benefit of priority to U.S. Provisional Application No. 62/416,973, filed Nov. 3, 2016, each of which is incorporated herein by reference in its entirety.

TECHNICAL FIELD OF THE INVENTION

This disclosure relates to the preparation, processing, and use of polymers derived from 1,3-propanediol, in particular, polyesters derived from 1,3-propanediol and diacids such as terephthalic acid and furan-2,5-dicarboxylic acid.

BACKGROUND OF THE INVENTION

Interest in new polymers based on furan-2,5-dicarboxylic acid as potential replacements for polymers based on terephthalic acid has increased in recent years, largely due to the ability to synthesize the furan-2,5-dicarboxylic acid based polymers from bio-based sources. As new furan-2,5-dicarboxylic acid based polymers, particularly polyesters, are being developed as packaging materials, there is an increasing need to enhance both the efficacy of the material for the specific application and safety. Recently, poly(trimethylene furan-2,5-dicarboxylate) (PTF) was identified as a target of interest for Archer Daniels Midland, DuPont, and other companies For example, ADM most likely will supply the furan-2,5-dicarboxylic acid (FDCA) or dimethyl furan-2,5-dicarboxylic acid (dimethyl FDCA) monomer and DuPont will likely leverage their 1,3-propanediol (1,3-PDO) capacity to supply the diol monomer.

One of the challenges of using 1,3-PDO with terephthalic acid in polyesters is its potential to form undesirable acrolein during synthesis and processing. Acrolein (1) is a conjugated aldehyde that is formed from the oxidation of allyl alcohol (2), which is formed from the degradation of the 1,3-PDO containing polyesters. As furan-2,5-dicarboxylic acid based polyesters become increasingly important, the need for managing the formation of allyl alcohol, acrolein, or both in the its 1,3-PDO containing polyester during synthesis and processing becomes more acute. What are needed are processes and compositions that can reduce, minimize or remove allyl alcohol and/or acrolein from 1,3-PDO based polyesters.

SUMMARY OF THE INVENTION

This disclosure relates to the preparation, processing, and use of polymers derived from 1,3-propanediol, including but not limited to polyesters derived from 1,3-propanediol and diacids such as terephthalic acid and furan-2,5-dicarboxylic acid. In particular, there are provided new processes and formulations for scavenging acrolein (1) and/or allyl alcohol (2) which may be produced as a degradation product during the preparation, processing, and use of these polymers. The processes and compositions of this disclosure are applicable to any polymer derived from 1,3-propanediol and is not limited to polyester only.

The undesirable formation of acetaldehyde in polyesters formed from 1,2-propanediol, particularly poly(ethylene terephthalate) (PET) has been examined in U.S. Pat. Nos. 6,274,212 and 6,762,275, and the undesirable formation of aldehydes in polyolefins has been examined in U.S. Pat. No. 6,632,874, each of which is incorporated herein by reference in their entireties However, these references do not describe the formation of acrolein or allyl alcohol as degradation products. Moreover, the degradation of the longer chain 1,3-propanediol containing polyesters has been poorly understood, and the lack of knowledge in this area limited possible solutions to their degradation.

This disclosure provides details regarding thermodynamic cycles that can be associated with the amine-class of possible aldehyde scavengers, particularly acrolein scavengers, and also discloses the use of such compounds as allyl alcohol scavengers during the melt processing of 1,3-propanediol derived polymers. This thermodynamic information relates primarily to the use in PTT (poly(trimethylene terephthalate)) and in PTF (poly(trimethylene furan-2,5-dicarboxylate)) but is also directly applicable to any polyester or polymer that can have acrolein (1) or allyl alcohol (2) as a degradation product. The disclosure further presents a thermodynamic assessment as a guide to understanding how aldehyde scavenging can be improved, and how this information can be applied to the chemistry of acrolein (1). Therefore, while not intending to be theory bound, it is thought that the thermodynamics models presented here provide a useful guide to developing the amine-class of possible aldehyde scavengers.

The formation of acrolein in PTF is shown as an example in Scheme 1, which shows the proposed mechanism for the formation of 1 and 2 in PTF as an example material. While not bound by theory, the same mechanism is expected to be applicable to PTT and other polyesters containing 1,3-PDO. This degradation mechanism is also generally accepted to occur in poly(trimethylene terephthalate) (PTT). Our modeling results suggest the same reaction occurs in PTF with the same reaction thermodynamics and activation energies as observed for PTT. Activation energies for this mechanism range from 45 to 52 kcal/mol depending on the type of catalyst used and the mechanism is unimolecular and of a concerted type. Therefore, the control that can be used would be limited to time and temperature optimization. There are other mechanisms for degradation and the use of stabilizers such as antioxidants and phosphorus compounds are important stabilizers against those reactions. This mechanism is of interest in that it is known to produce a vinyl end group, which upon hydrolysis, yields allyl alcohol (2).

Scheme 1

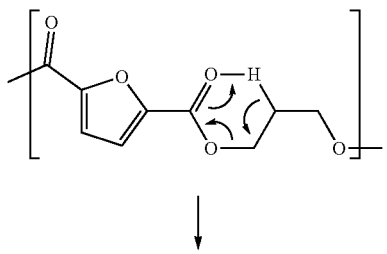

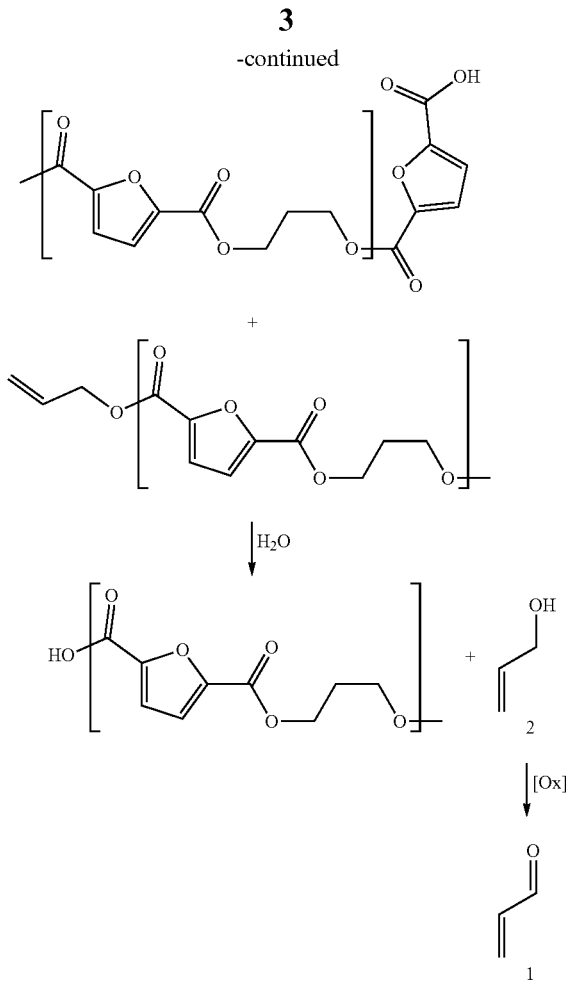

In an aspect, the first line of action for the reduction or minimization of the formation of 1 in PTT, PTF or other 1,3-PDO containing polyesters is to prevent its formation in the first place. In an aspect, this can be accomplished by the control of the amount of oxygen during processing and/or the minimization of time, temperature and shear effects. If these do not result in the elimination of 1 or reduction to desired levels, then other approaches are available. Therefore, this disclosure provides for methods for managing and controlling the formation of acrolein during synthesis and processing of 1,3-PDO based polyesters by scavenging the acrolein that is produced. These and other aspects are explained fully in this disclosure, including the schemes and figures.

DETAILED DESCRIPTION OF THE INVENTION

Figure 1:
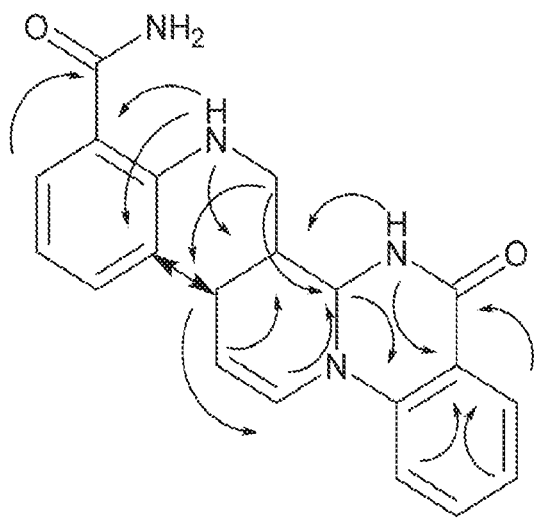
FIG. 1 presents the enamine structure of the reaction product of anthranilamide (AAA, 3) and acrolein (1), based upon the NMR data. The single headed arrows indicate key long range $^1H$—$^{13}C$ correlations. The double headed arrow indicates a key NOE interaction.
Figure 2:
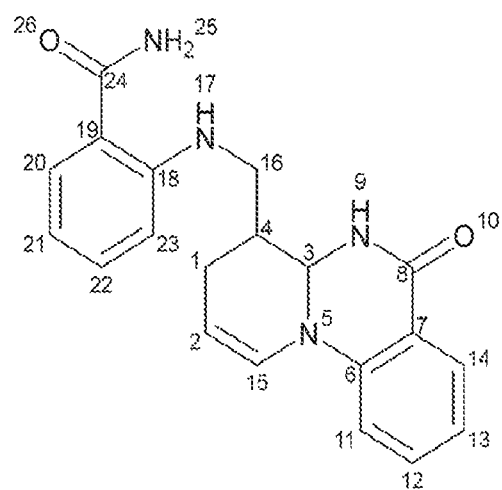
FIG. 2 provides supplemental NMR data for the enamine structure of the reaction product of anthranilamide (3) and acrolein (1), with numbering scheme.
Figure 3A:
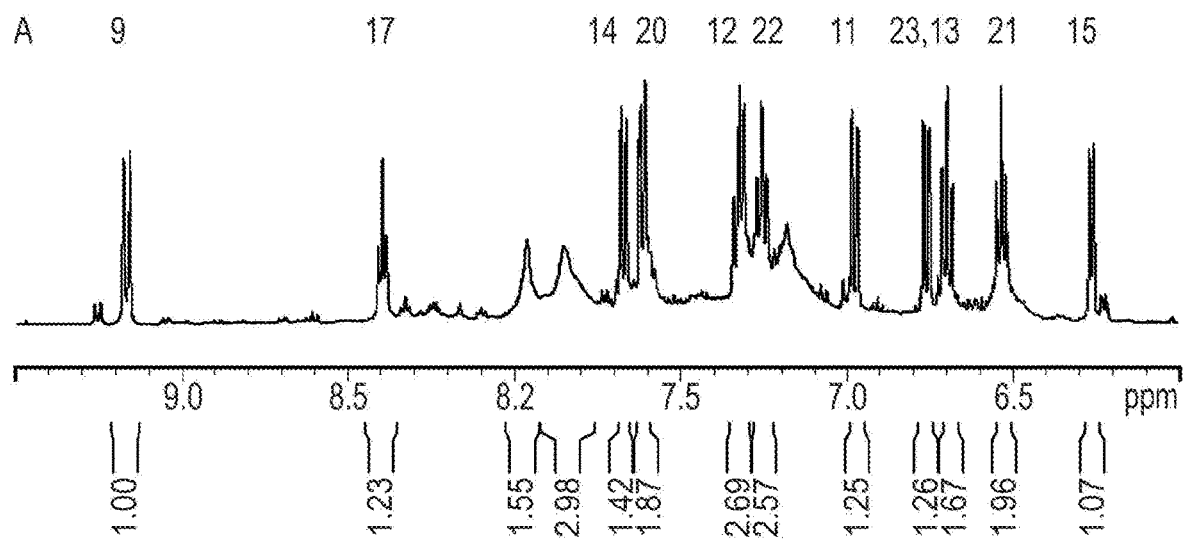
FIG. 3A illustrates supplemental NMR data for the structure of the reaction product of anthranilamide (3) and acrolein (1), with the expansion of the aromatic region of the $^1H$ spectrum. The numbers above the peaks represent the proton peak assignments.
Figure 3B:
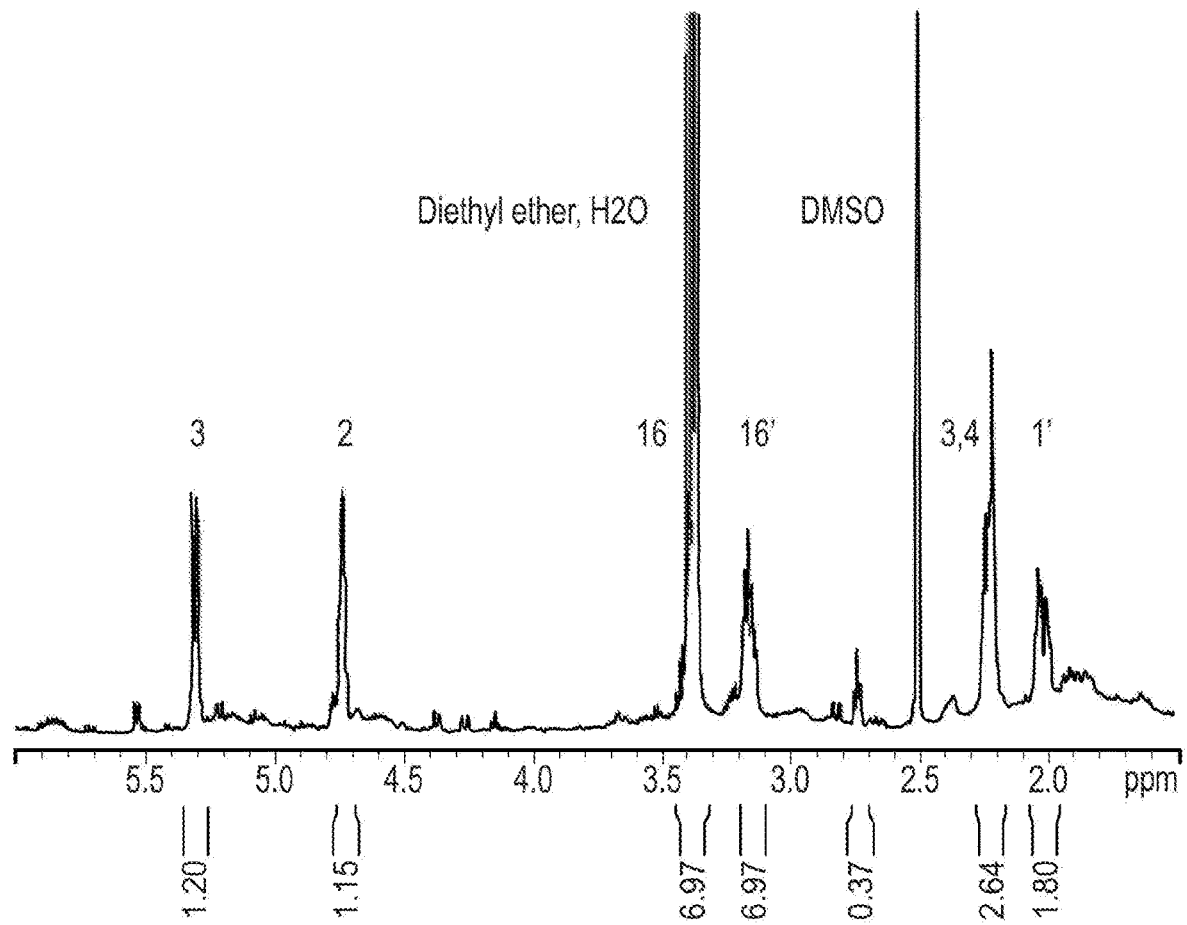
FIG. 3B illustrates supplemental NMR data for the structure of the reaction product of anthranilamide (3) and acrolein (1), with the expansion of the aliphatic region of the $^1H$ Spectrum.

The desire to detect and control 1 in PTF and other polymers such as other polyesters is several fold: assessment and control of polymer degradation during processing and control of a known toxin and mutagen. The presence of 1 can develop during melt processing of PTF and other 1,3-PDO containing polyesters. As applications and development with PTT and PTF are expected to expand, safety is of concern where the formation of 1 can occur. In the late 1990s and early 2000s, regulatory agencies evaluated the safety and potential harm of 1 in food products and determined in most cases that there was 1) a poor understanding of the acute health effects of 1 at low levels, 2) that 7.5 ppb of 1 in food may be considered an upper limit of what is possible to have based on known chemistry, and 3) that there is little to no information on the chronic effects of 1 from foodstuffs. There is no assessment of the safety of 1 in packaging materials. Recent research in the last 10 years has clearly shown that 1 can interact with proteins, DNA and RNA and impede function and perhaps lead to mutagenicity. There is clearly more work to be done in demonstrating the actual and real threat to health and life with regards to chronic exposure to 1, making control, reduction, or elimination of 1 important.

In one aspect, this disclosure provides a process for reducing or removing acrolein and/or allyl alcohol from a polyester composition, the process comprising: combining a polyester composition derived from 1,3-propanediol with an amino amide or a primary amine; wherein the amino amide or the primary amine is combined in sufficient quantities to scavenge acrolein or allyl alcohol produced from degradation of the polyester composition. In another aspect, this process can further include reducing the amount of oxygen present in the polyester composition. The polyester composition can comprise, for example, poly(trimethylene furan-2,5-dicarboxylate) (PTF) or poly(trimethylene terephthalate) (PTT). In another aspect, the amino amide can be for example a β-amino amide such as anthranilamide or an α-amino amide such as 2-aminoacetamide, and the primary amine can be for example, an alkyl amine or aniline.

This disclosure also provides, in another aspect, a polyester composition comprising: a polyester composition derived from 1,3-propanediol; and an amino amide or a primary amine, present in sufficient quantities to scavenge acrolein or allyl alcohol produced from degradation of the polyester composition. The composition can also have a reduced amount of oxygen, for example by replacing some of substantially all of the oxygen present with an inert gas such as nitrogen. The polyester composition can be fabricated into, for example, a film, a fiber, or a container.

According to another aspect, this disclosure provides a process for removing acrolein or allyl alcohol from a polymer composition, the process comprising: combining a polymer composition derived from 1,3-propanediol with an amino amide or a primary amine; wherein the amino amide or the primary amine is combined in sufficient quantities to scavenge acrolein or allyl alcohol produced from degradation of the polymer composition. Also in this aspect, this process can further include reducing the amount of oxygen present in the polyester composition.

Modeling Methodology and Procedure

In developing the methods and compositions of this disclosure, certain reactions were modeled using ab initio methods using Spartan '14 software. Models compounds were first minimized to low energy equilibrium geometries using DFT methods with a B3LYP hybrid functional system and a simple 6-31G* basis set. This basis set was chosen for geometry optimization as it has been optimized common organic elements and the first two rows of transition metals as well as being the simplest basis set that accounts for diffuse interactions. Once the geometries were optimized, single point energies using a 6-311+G(2df,2p) basis set was performed on all models to gain accuracy in determining the thermodynamic values. For the model system of anthranilamide (AAA, 3), single point energies using a 6-311+G** basis was also employed for comparison. All three basis set results are reported for the system of 1 and 3 but results are limited to the 6-311+G(2df,2p) basis sets for the remaining systems modeled.

Results and Data: Anthranilamide (3) and Acrolein (1)
While not theory bound, the reaction of 3 with 1 is thought to follow two major pathways and is shown in Scheme 2. Thus, Scheme 2 provides a reaction scheme and pathways for scavenging of acrolein (1) by AAA (3). The reaction of the aldehyde functionality of 1 with the amine functional group of 3 is believed to result in the formation of an imine intermediate (with the loss of water) that then reacts with the amide functionality of 3 to give a cyclic product. This mechanism corresponds to the reaction mechanism of 3 with acetaldehyde (AA, 4).

Scheme 2.

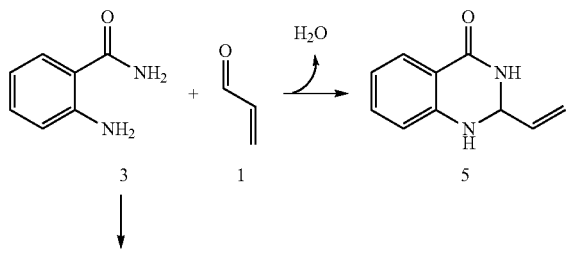

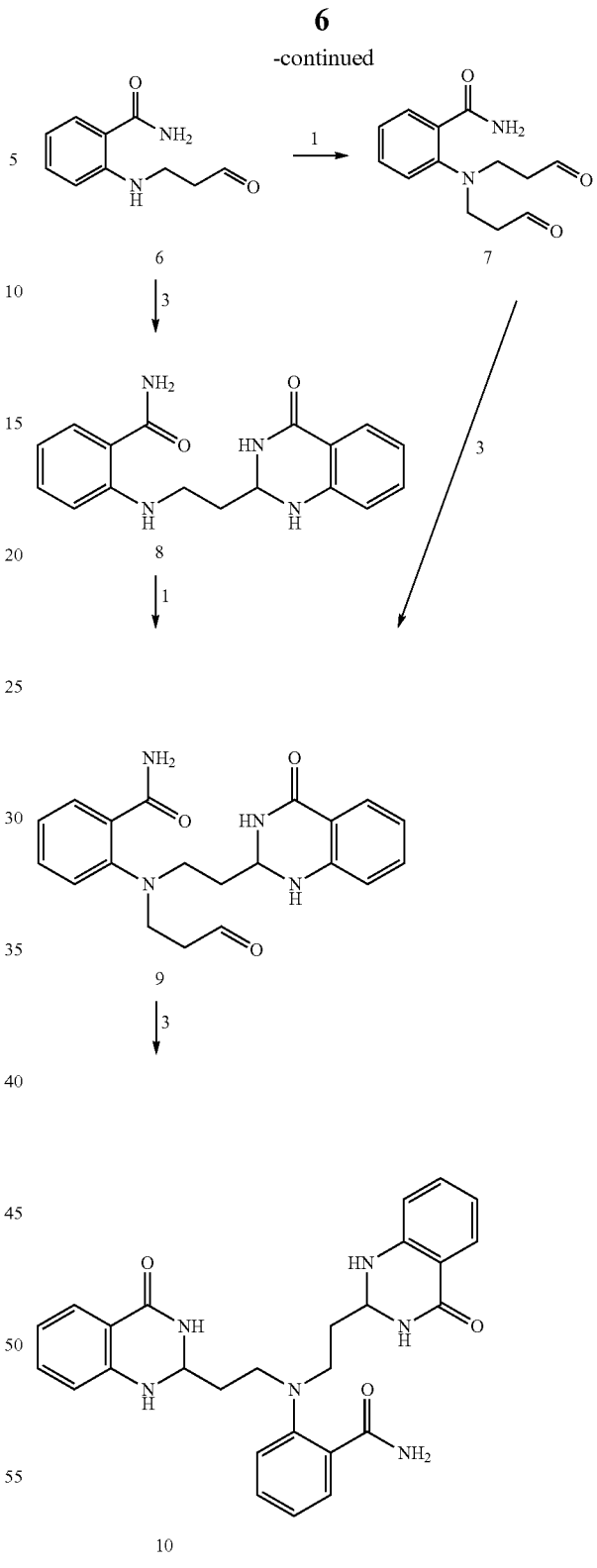

The thermodynamic energy values for the initial reactions are shown in Table 1 for all three basis sets detailed earlier. The larger two basis sets are in better agreement with each other and are regarded to be more accurate for single point energy calculations in general. The values for the two larger basis sets are in closer agreement with each other and the 6-311+G(2df,2p) basis set results will be used for comparison to other reactions schemes.

TABLE 1

Thermodynamic equilibrium energy (ΔG°) summary
for the initial reactions of 3 with 1.

| Reaction | 6-31G* | 6-311 + G** (kJ/mol) | 6-311 + G(2df, 2p) |
|---|---|---|---|
| 3 + 1 → 5* | 25.15 | 8.48 | 7.39 |
| 3 + 1 → 6 | −44.05 | −24.90 | −23.53 |
| 6 + 1 → 7 | −23.72 | −0.972 | 3.65 |
| 3 + (2)1 → 7 | −67.81 | −25.88 | −19.84 |

*Water is a reaction byproduct and is accounted for but not noted in this table explicitly.

For this model system, we see that the overall reaction to produce water and bicyclic product, (3+1→5+H$_2$O), via an imine intermediate, is a net endothermic reaction. The values of 8.48 and 7.39 kJ/mole are not excessively endothermic but large enough that one would believe that these reactions would only occur at significantly elevated temperatures. The Michael reaction route of 3+1→6 followed by 6+1→7 and summarized by 3+(2)1→7 is net exothermic but a combination of exothermic and endothermic steps according to the 6-311+G(2df,2p) results. While not intending to be theory bound, this data points to two endothermic reactions that can occur with an approximate 5 kJ/mol energy difference. Additionally, the exotherms are larger than the endotherms implying that the energy released during the Michael addition chemistry can facilitate the imine route.

The results of the modeling are in alignment with observations made in the laboratory. For example, a mixture of 3 and 1, neat, produced heat with only a slight but very noticeable warming of the vial. This would be indicative of the Michael addition route being the predominate pathway at room temperature.

However, this model is not supported by NMR evidence from the reaction of AAA and acrolein. The structures that were determined support the first step of the reaction using the Michael addition chemistry, but is followed by additional Michael reactions rather than immediate imine for formation. The NMR evidence provided below clearly shows differential chemistry from AAA and acetaldehyde.

Comparison to the Reaction of AAA (3) and Acetaldehyde (4)

The reaction between 3 and 4 (acetaldehyde) is known and is the dominate reaction that occurs in PET when 3 is added during injection molding of preforms to control the presence of 4. The scheme for the overall reaction and the imine intermediate for the scavenging of 4 by 3 is shown in Scheme 3.

Scheme 3.

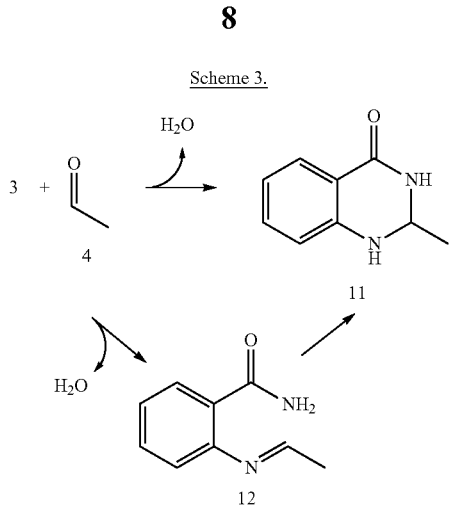

In this case, there is no chemistry that can occur that results in anything other than the formation of the imine intermediate 12 that then leads to final product 11. The thermodynamic equilibrium energies are summarized in Table 2.

TABLE 2

Equilibrium Energy Values for the Reaction of 3 with 4.

| Reaction | 6-311 − G(2df, 2p) Energy (kJ/mol) |
|---|---|
| 3 + 4 → 11 + H$_2$O | 21.57 |
| 3 + 4 → 12 + H$_2$O | 39.74 |
| 12 → 11 | −18.17 |

Overall, the reaction is endothermic with a large endothermic barrier to the initial imine formation. The cyclization reaction is net exothermic, but only about half as energetic as the first reaction. The reaction of 3 with 1 has a lower thermodynamic barrier that that of 3 and 4, a reaction which has been shown to be commercially viable and effective. If one assumes that the same trend occurs in the thermodynamics of 3 and 1 to give 5, then one would expect the energetic barrier to imine formation to be significantly lower. This can be explained by the formation of a more stable conjugated imine compared to intermediate 12. Therefore, while not intending to be bound by theory, we cannot discount the imine route in the reaction of 3 and 1, but we can say that most likely it will not be the first reaction to occur unless it is kinetically favored. Additionally, the postulate that the reaction of 3 and 1 is fundamentally different from the reaction of 3 and 4 and will give different products can now be supported. As a result, it has been discovered that the same considerations and Expansion of Scavenging Agents to Additional Classes of Amines, an Example.

Based on this analysis and given that the primary reaction expected initially is a Michael reaction, the classes of useful scavengers for acrolein and allyl alcohol can be expanded. In one aspect, it has been found that primary amines are sufficiently reactive for this purpose, and there are numerous primary amines that can function as scavengers. In addition, polyamines or amine modified polymers and dendrimers can also function as scavengers in this regard. Aziridine derived polymers or aziridine modified polymers are also useful for this application. Additional polymer examples would include, for example, the use of hydrolyzed poly(N-vinylformamide) or poly(N-vinylacetamide). These last two would produce linear polyolefins with pendant amines compared to the branched structures of aziridine derived polymers or dendrimers.

To better understand and model both small molecule amines and polymeric amines, a model scavenger of isopropylamine, 13, was chosen. Since this is a simple amine, the chemistry will be limited to the initial Michael reaction pathways that we described earlier for the reaction of 3 with 1. The proposed reaction pathways for the reaction of isopropylamine (13) with 1 are shown in Scheme 4, and the 6-311+G(2df,2p) energy results are shown in Table 3. There are two reaction pathways that can initially occur, the formation of an imine intermediate or the formation of a Michael reaction adduct.

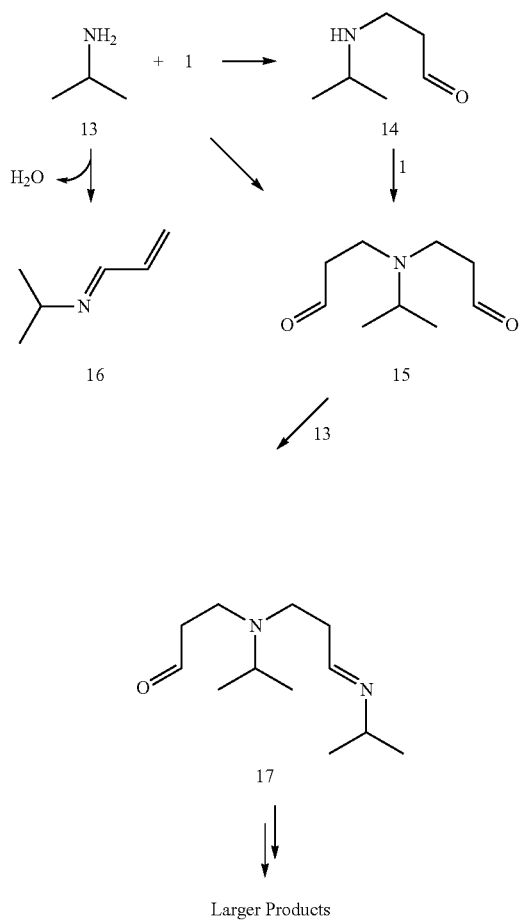

Scheme 4.

We can see from the data in Table 2 that the reaction of isopropylamine is strongly exothermic when the Michael reaction pathway is invoked, as in product 14. Unlike the reaction of 3 and 1, the second addition is also exothermic and strongly so, product 15. The formation of the imine intermediate 16 is endothermic but very much less so than the reaction of 3 with 4. The use of primary amines without the presence of amide functionality can provide simpler chemistry but as illustrate in the possible reaction to produce product 17 that given enough time and high enough concentrations, larger molecules and adducts can be formed.

TABLE 3

Equilibrium Energy Values for the Reaction of 13 with 1.

| Reaction | 6-311 + G(2df, 2p) Energy kJ/mole |
|---|---|
| 1 + 13 → 14 | −49.26 |
| 13 + (2)1 → 15 | −77.69 |
| 14 + 1 → 15 | −28.43 |
| 1 + 13 → 16 | 12.66 |

Small Molecule Amide-Amine Models and Examples

The copolymerization of acrylamide with a suitable monomer can result in the polymer with both amine and amide functional groups in close proximity. This can also be achieved in a number of small molecules that have an amine in the β-position relative to an amide. An example of this class of materials is 3-aminobutylmide, 18, a small molecule mimic of the active region of 3. These can define the entire class of amino-amides as aldehyde scavengers. Further, peptide amides, with the amino group α- to the amide group can also function as good aldehyde scavengers with the final cyclic product being a 5-membered ring rather than a 6 membered ring. This analysis focuses primarily on the β-amino examples, but is also applicable to the α-amino class as well.

The proposed scheme for the reactions of β-aminoamide 18 with 1 is shown in Scheme 5 and the results of the modeling are summarized in Table 4. This scheme is not comprehensive in that there are additional reactions that can occur due to the extended conjugation of the imine functionalities.

TABLE 4

Equilibrium Energy Values for the Reaction of 13 with 1.

| Reaction | 6-311 + G(2df, 2p) Energy kJ/mole |
|---|---|
| 18 + 1 → 19 | −42.50 |
| 19 + 1 → 20 | −20.94 |
| 18 + (2)1 → 20 | −63.44 |
| 18 + 1 → 21* | −3.74 |
| 21 → 22 | 5.05 |

*Water is a reaction byproduct and is accounted for but not noted in this table explicitly.

Scheme 5.

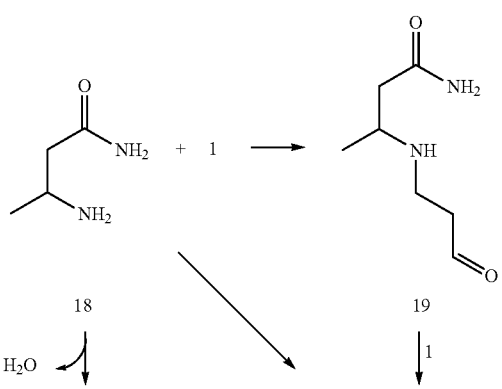

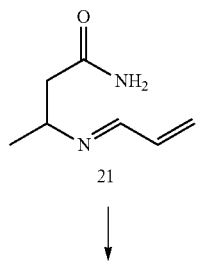

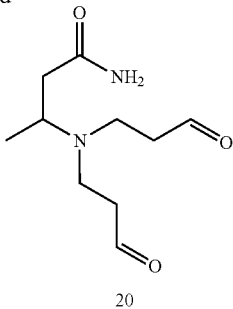

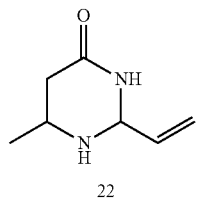

Similar to the other model systems, the Michael addition route is energetically favored compared to the formation of the imine and subsequent cyclization. In this case, the cyclization is endothermic and the imine formation is only slightly exothermic making the imine/cyclization route almost energetically neutral. The Michael addition route though is on par energetically with the other models and should dominate the chemistry from an equilibrium perspective. This model suggest that β-aminoamides can be functional aldehyde scavengers. Given the small energetic differences between 5- and 6-membered carbocycles and heterocycles of similar composition without aromaticity, α-aminoamides, i.e., peptide amides, also can be acceptable aldehyde scavengers.

Molecules for Acrolein Scavenging in Films, Fibers, Containers, and Other Applications The anthranilamide (3), β-aminoamide (18), and isopropylamine (13) reactions modelled above provide a range of amine molecules that can be used for acrolein or allyl alcohol scavenging in polyester compositions, fibers, films, or containers such as bottles including carbonated soft drink bottles.

In one aspect, there are a number of amide amines that can be used to scavenge acrolein (1), including, but not limited to, β-amino amides such as anthranilamide (3), the β-aminoamide (18) (3-aminobutanamide), 3-aminopropanamide, 3-amino-2-methylbutanamide, 3-amino-2-phenylbutanamide, and their substituted analogs. For example, substituted analogs can include but are not limited to, their alkyl-, aryl- (for example phenyl- or tolyl-), amino-, alkoxy-, hydroxy- or halo-substituted analogs.

In another aspect, a number of α-amino amides can be used to scavenge acrolein (1), including, but not limited to, a 2-aminoacetamide, a 2-aminopropanamide, a 2-alkyl-2-aminoacetamide, a 2-alkyl-2-aminopropanamide, a 2-aryl-2-aminoacetamide, a 2-aryl-2-aminopropanamide, a 2-benzyl-2-aminoacetamide, a 2-benzyl-2-aminopropanamide, a 2-(alkylamino)acetamide, a 2-(alkylamino)propanamide a 2-(arylamino)acetamide, a 2-(arylamino)propanamide, a 2-(benzylamino)acetamide, or a 2-(benzylamino)propanamide, or a substituted analog thereof. For example, substituted analogs can include but are not limited to, their alkyl-, aryl- (for example phenyl- or tolyl-), amino-, alkoxy-, hydroxy- or halo-substituted analogs.

According to a further aspect, there are a number of amines that can be used to scavenge acrolein (1), including, but not limited to, aromatic amines, aliphatic amines such as alkyl amines, and combinations thereof. Examples include but are not limited to isopropylamine (13), methylamine, ethylamine, n-propylamine, n-butylamine, isobutylamine, pentylamine, cyclohexyl amine, allyl amine, aniline, and the like. In addition, aliphatic polyamines can be used, including but not limited to, N,N-dimethylaminopropylamine, N,N-dimethylaminoethylamine, N,N-diethylaminopropylamine, of N,N-diethylaminoethylamine.

According to an aspect, the amino amide or the primary amine can be included in the polyester composition, for example, a melt-processed polyester composition, from about 10 ppm to about 10,000 ppm. The amino amide or the primary amine also can be included in the polyester composition from about 10 ppm to about 5,000 ppm, from about 10 ppm to about 2,500 ppm, or from about 10 ppm to about 1,000 ppm. The amino amide or the primary amine also may be in the polyester composition in a concentration of from about 100 ppm to about 2,000 ppm, from about 200 ppm to about 1,000 ppm, or from about 350 ppm to about 650 ppm. For example, the amino amide or the primary amine also can be included in the polyester composition in about 10 ppm, 20 ppm, 50 ppm, 100 ppm, 200 ppm, 300 ppm, 400 ppm, 500 ppm, 600 ppm, 700 ppm, 800 ppm, 900 ppm, 1,000 ppm, 2,000 ppm, 3,000 ppm, 4,000 ppm, 5,000 ppm, 6,000 ppm, 7,000 ppm, 8,000 ppm, 9,000 ppm, 10,000 ppm, or any ranges between any of these numbers. In another aspect, the amino amide or the primary amine included in the polyester composition can have a thermal decomposition temperature greater than about 250° C., greater than about 270° C., greater than about 300° C., or greater than about 325° C., which makes these compounds particularly useful for a range of melt-processed 1,3-propanediol (1,3-PDO) based polyester compositions.

According to a further aspect, in addition to the β-amino amide and α-amino amide scavengers of this disclosure, other heteroatom functionalized acrolein scavengers that include at least two heteroatom functional groups with at least one hydrogen bonded to each heteroatom group can be used as disclosed herein. Suitable heteroatoms include oxygen, sulfur, and nitrogen. It is not necessary that the two heteroatom-$H_x$ (x is at least 1) moieties be α- or β-situated, as other orientations and isomers can also serve as suitable scavengers. The organic additive compound is sufficiently thermally stable at the melt processing temperature of the polyester that its utility is maintained. For example, suitable heteroatom functional groups for the acrolein scavengers can include, for example, amine ($NH_2$ and NHR), hydroxyl (OH), carboxyl ($CO_2H$), amide ($CONH_2$ and CONHR), sulfonamide ($SO_2NH_2$), and thiol (SH). Examples of such compounds are disclosed in U.S. Pat. Nos. 6,274,212, 6,762,275, and 6,632,874, each of which is incorporated herein by reference.

In this aspect, for example, and in addition to anthranilamide descried above, suitable scavengers can include for salicylamide, salicylanilide, o-phenylenediamine, 3,4-diaminobenzoic acid, 1,8-diaminonaphthalene, o-mercaptobenzamide, N-acetylglycinamide, malonamide, 3-mercapto-1,2-propanediol, 4-amino-3-hydroxybenzoic acid, 4,5-dihydroxy-2,7-naphthalenedisulfonic acid disodium salt, biuret, 2,3-diaminopyridine, 1,2-diamino-anthraquinone, dianilinoethane, allantoin, 2-aminobenzenesulfonamide, and 2-amino-2-methyl-1,3-propanediol.

Therefore, this disclosure provides a method and compositions for decreasing acrolein and/or allyl alcohol content of melt processed 1,3-PDO derived polyester by combining the disclosed scavengers with melted polyester which reacts with and thereby remove the acrolein and/or allyl alcohol. In an aspect, the scavenger compound can be added at relatively low levels to the polyester and still sufficiently decrease the acrolein and/or allyl alcohol content of the polyester. In addition, combining the scavenger compound with the polyester requires no special equipment or processing steps.

Sample Preparation and NMR Data Acquisition 50 mg of the reaction product was dissolved in DMSO (d6). NMR spectra was acquired utilizing a 5 mm TCI prodigy probe installed on a Bruker Avance III HD spectrometer operating at a nominal proton frequency of 500.13 MHz. 1D proton and carbon spectra along with 2D homo- and hetero-nuclear correlation experiments was acquired (1H-1H COSY, 1H-1H ROESY, 1H-13C edited-HSQC, 1H-13C HSQC-TOCSY, and 1H-13C HMBC).

$^1$H NMR (DMSO, 500 MHz): β=2.01 (1H, m), β=2.21 (1H, m), β=2.22 (1H, m), β=3.15 (1H, m), β=3.38 (1H, m), 4.73 (1H, pt, J=7.4 Hz, 6.1 Hz, 3.9 Hz), β=5.30 (1H, dd, J=8.6 Hz, J=3.9 Hz), β=6.26 (1H, d, J=6.1 Hz), β=6.53 (1H, dt, J=8.0 Hz, 0.9 Hz), β=6.69 (1H, dt, J=8.0, 1.0 Hz), β=6.76 (1H, d, J=8.2 Hz), 6.97 (1H, d, J=8.2 Hz), β=7.25 (1H, dt, J=7.5 Hz, 1.4 Hz), β=7.32 (1H, dt, J=7.3 Hz, 1.4 Hz), β=7.6 (1H, dd, J=7.9 Hz, 1.4 Hz), β=7.7 (1H, dd, J=8.0 Hz, J=1.4 Hz), β=8.40 (1H, t, J=6.2 Hz, 5.9 Hz), β=9.2 (1H, d, J=8.6 Hz). $^{13}$C NMR (DMSO, 125.75 MHz) β=20.7, 34.9, 43.4, 79.0, 98.7, 111.2, 113.2, 114.1, 114.2, 115.0, 116.4, 129.0, 129.2, 132.5, 132.7, 141.1, 147.5, 149.8, 171.5, 171.7.

NMR Results and Data

Spin systems were identified using the 1D proton spectrum and further confirmed using the 2D COSY experiment. Two similar ortho di-substituted aromatic rings were readily identified in the proton 1D spectrum. The remaining spin systems were identified through the use of the 2D COSY and 2D multiplicity edited HSQC. The spin systems or molecular fragments were pieced together utilizing observed long range 1H-13C correlations and connectivities observed in the 2D ROESY experiment. The NMR data are consistent with the proposed structure shown in FIG. 1.

Rationalization of the NMR Structure and Modeling Results

The major product suggested by the NMR results shows promise in describing a different set of chemistry from the AAA and AA reaction shown in Scheme 3. The simplicity of the chemistry comes from the fact that the reaction is terminal, no further chemistry can occur once the reaction proceeds down that path. Compared to the chemistry of Scheme 2, which is non-terminal once the amine has reacted with acrolein via a Michael addition, we can see that there is a wealth of chemistry available that cannot be inferred from the reaction of AAA with AA when applied to acrolein. To start with only 1 and 3 as starting materials, we need to invoke some additional chemistry to reach the proposed NMR product. Starting with the conversion of 1 and 3 to product 6, we can invoke the presence of a base to facilitate an enolate formation reaction and further reaction with acrolein, Scheme 6. Thus, Scheme 6 illustrates a reaction scheme by which the proposed NMR product can form in the presence of a base, which facilitates an enolate formation reaction and further reaction with acrolein (1).

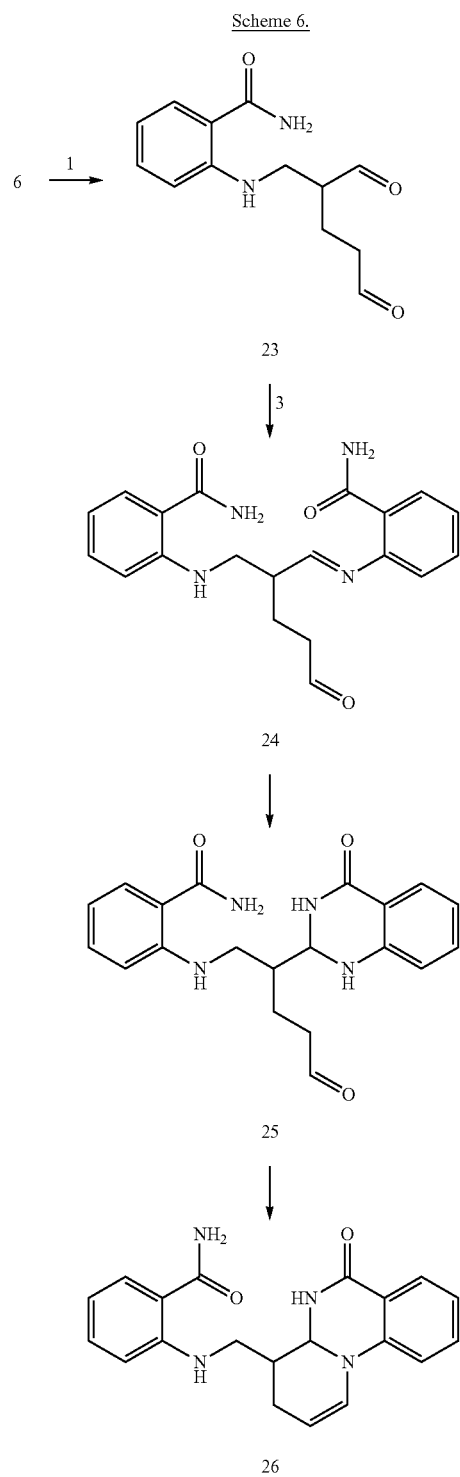 [SMILES: NC(=O)c1ccccc1NCC(C=O)CCC=O ; NC(=O)c1ccccc1/N=C/C(CCC=O)CNc1ccccc1C(N)=O ; NC(=O)c1ccccc1NCC(CCC=O)C1NC(=O)c2ccccc2N1 ; NC(=O)c1ccccc1NCC1CC=CN2c3ccccc3C(=O)NC12]

Scheme 6.

The reaction of 6 with 1 invoking emulate chemistry would give 23 once that enolate participated in a successive Michael addition reaction. It is unclear at this point why C-addition is favored over O-addition in this case and why 1,4-addition is favored in the Michael reaction as opposed to 1,2-addition. There is literature that the presence of amine salts can influence the selectivity of Michael reactions with unsaturated aldehydes. The intermediate 23 then reacts with 3 to give an imine intermediate 24. As for the selectivity of one aldehyde group over another, no comment can be made other than the rationalization of the path to target becomes much more difficult. The imine 24 then undergoes internal reaction with the amide group to give the cyclic intermediate 25. This intermediate 25 then undergoes condensation of the secondary amine with the free aldehyde group to give the final cyclic enamine product 26, as proposed by the NMR data. The selectivity of the cyclic secondary amine over the linear secondary amine may be due to the influence of the free amide group interacting with the linear secondary amine to reduce the nucleophilic character by drawing away electron density. The cyclic secondary amine cannot interact with the its nearest amide group as the hydrogen on the nitrogen atom of the amide is locked in an exocyclic position away from the amine.

The modeling data suggests that the mechanism by which anthranilamide can scavenge acrolein is 1) different from the mechanism in which it scavenges acetaldehyde, 2) is energetically more favorable to do so, 3) has more chemical pathways in which to scavenge acrolein and most likely other conjugated and non-conjugated aldehydes. Additionally, the same chemistry can be leveraged to make use of other scavengers for acrolein. Most useful would be the polymeric amines and amidoamines as they present some advantages with regards to handling, blending and reduced likelihood of migration. The source of acrolein for these types of scavengers is irrelevant. Any polyester that uses 1,3-PDO can form acrolein during degradation and processing and these materials will be useful. Additionally, we can extend the range of possible scavengers too small to large amines and even into peptide-like amides if desired.

The chemistry presented and modeled here is by no means conclusive or comprehensive. However, the basis for differentiation of the reaction of anthranilamide and acrolein is strongly supported by both NMR analysis of a simple reaction of the two materials and the modeling presented.

Radical initiators can also be used as acrolein scavengers. These initiators decompose at elevated temperatures into free radicals that react with unsaturated bonds such as the allyl group in acrolein. They can also be used in conjunction with anthranilamide in which case peroxides will inhibit the Michael addition reaction of scheme 3+1 to 6 and promote the commercial viable and proven effective scheme 3+1 to 5.

Examples of radical initiators are organic peroxides such as benzoyl peroxide, dibenzoyl peroxide, dilauroyl peroxide, di(tert-butylperoxyisopropyl)benzene, dicumyl peroxide, 1,1,3,3-Tetramethylbutyl hydroperoxide; carbon-carbon initiators such as 2,3-Dimethyl-2,3-diphenylbutane and azo initiators such as AIBN, 1,1-Azodi(hexahydrobenzonitrile), 2,2'-Azodi(isobutyronitrile).

Compounding of Poly(trimethylene furan-2,5-dicarboxylate) with Anthranilamide

A series of compounding experiments were conducted to experimentally prove the formation of acrolein during the processing of PTF and the influence of different processing conditions, such as temperature, gas environment, and shear rate. Pure PTF was compounded using a Thermo Scientific HAAKE MiniLab II micro compounder. During the runs, counter rotating twin screw mode was used to improve sample mixing. Two different gas environments, dry nitrogen and lab room air, were used during the runs. The samples were processed at two different temperatures 230 and 260° C. There different screw speeds, 20, 60, and 180 rpm, were used during compounding. Based on the geometry of the unit, volumetric flow data provided by the manufacturer, and transport equations, these rpm values were calculated to be approximately equivalent to 71, 213, and 650 $s^{-1}$, respectively. For all the runs the average residence time was of approximately 5 minutes. Prior to the compounding process, the PTF resin was placed in a vacuum oven at 130° C. for at least 4 days. After compounding, each extrudate was immediately placed in a sealed barrier bag. Headspace GC analysis was used to quantify the concentration of acrolein and allyl alcohol in each samples. Sample preparation and headspace GC results are discussed in the next section.

After confirming the formation of acrolein during the processing of pure PTF, the effect of the addition of AAA to scavenge acrolein was experimentally tested. PTF and AAA were compounded under lab room air at 260° C., 180 rpm (650 $s^{-1}$), and 5 minutes residence time. The same micro compounder and counter rotating screw mode were used. These processing conditions were selected because they are the closest to regular industrial scale processing that could readily be performed with the current lab scale setting. The concentration of AAA in the mixture was 1.0 wt %. In addition, pure PTF sample was compounded at the exact same conditions as control.

Sample Preparation and Headspace GC Data Acquisition

PTF polymer samples were cryogenically grinded into a fine powder (<1 mm). Headspace analysis was conducted on 100 mg of the ground PTF using an Agilent Technologies headspace autosampler GC/FID equipped with J&W PoraPLOT Q column and EST analytical autosampler Agilent Technologies GC/MS equipped with J&W DB-624 column.

Headspace GC/FID and GC/MS Results and Data

Figure 4:
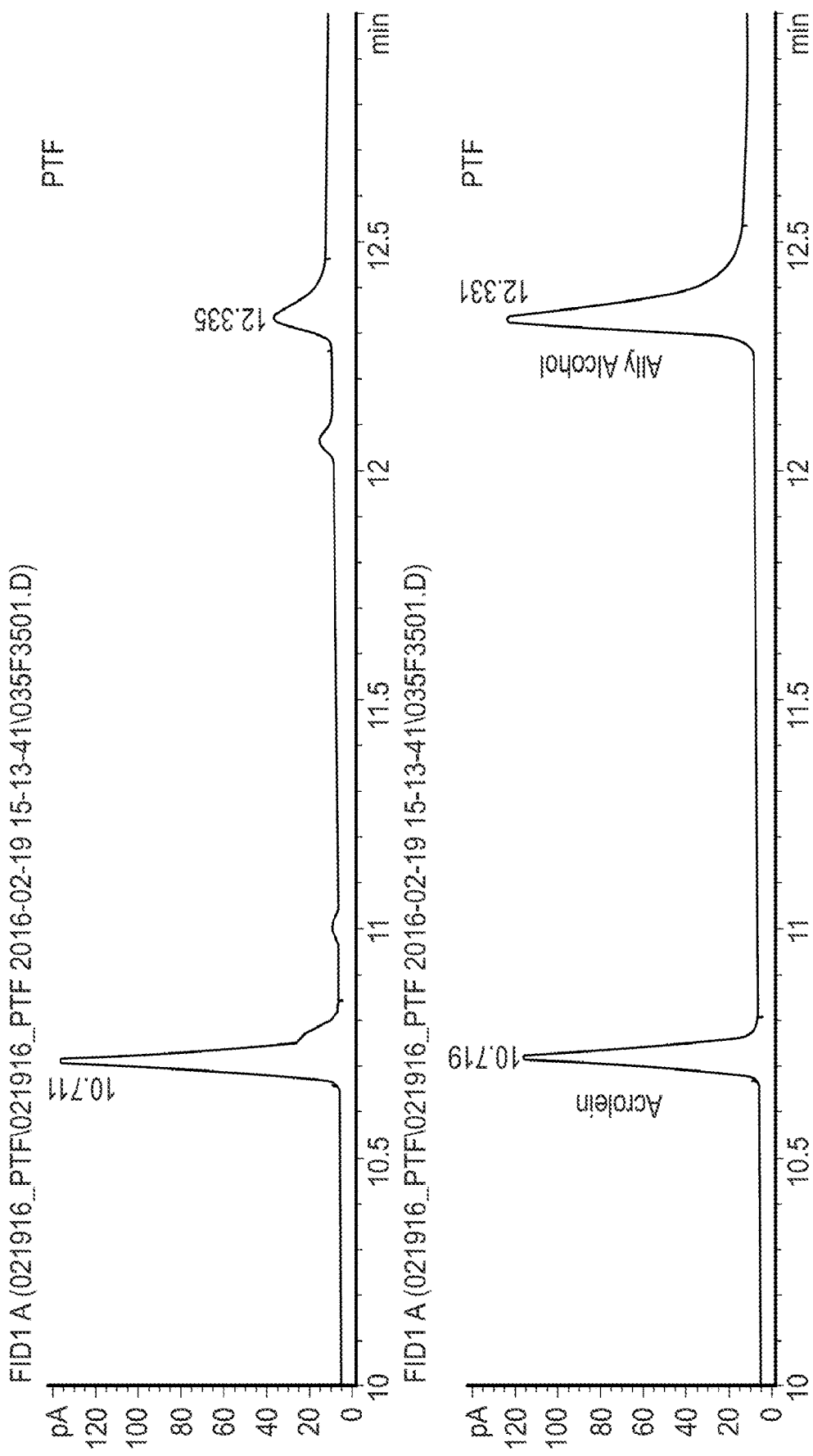
FIG. 4 illustrates a headspace GC/FID chromatogram overlay of melt twin extruded PTF at 260° C. and 180 rpm under air (top) and an acrolein and allyl alcohol mixed standard (bottom).
Figure 5:
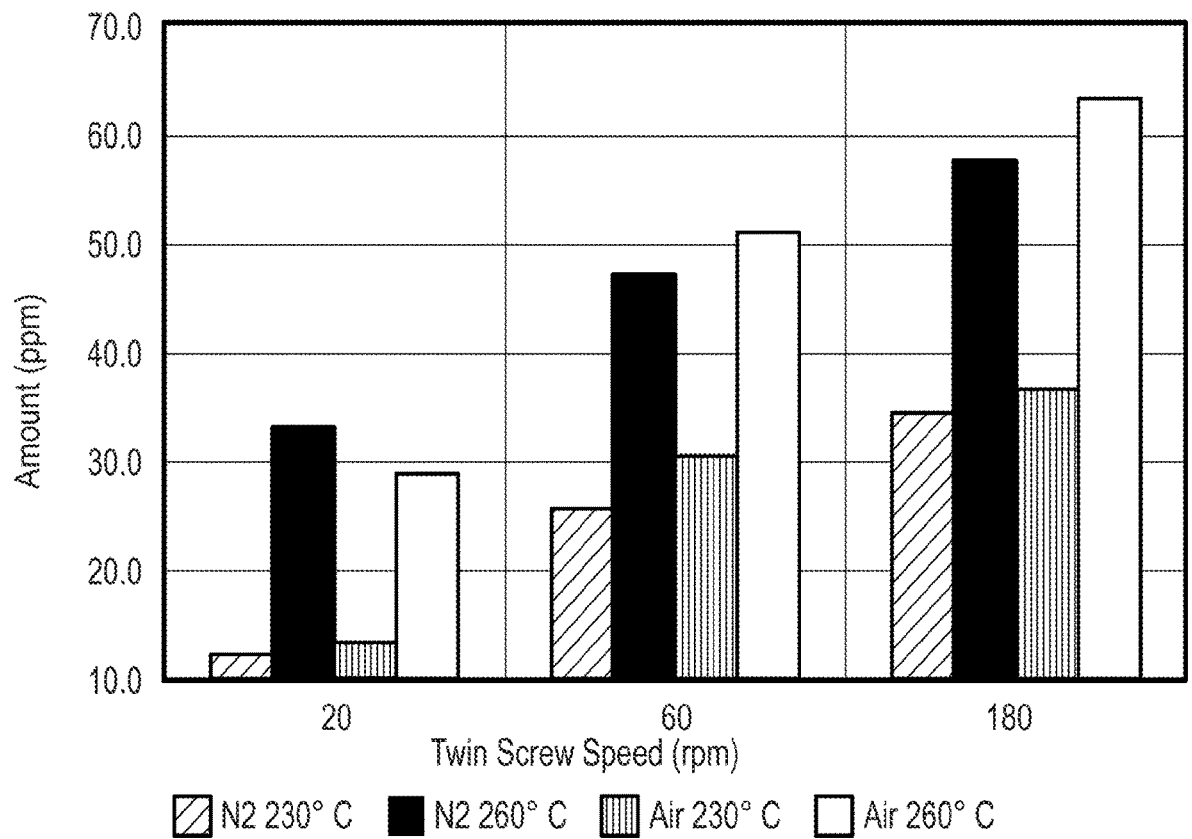
FIG. 5 shows acrolein content in melt twin extruded PTF at 230 and 260° C. and 20, 60, and 180 rpm under nitrogen and air.
Figure 6:
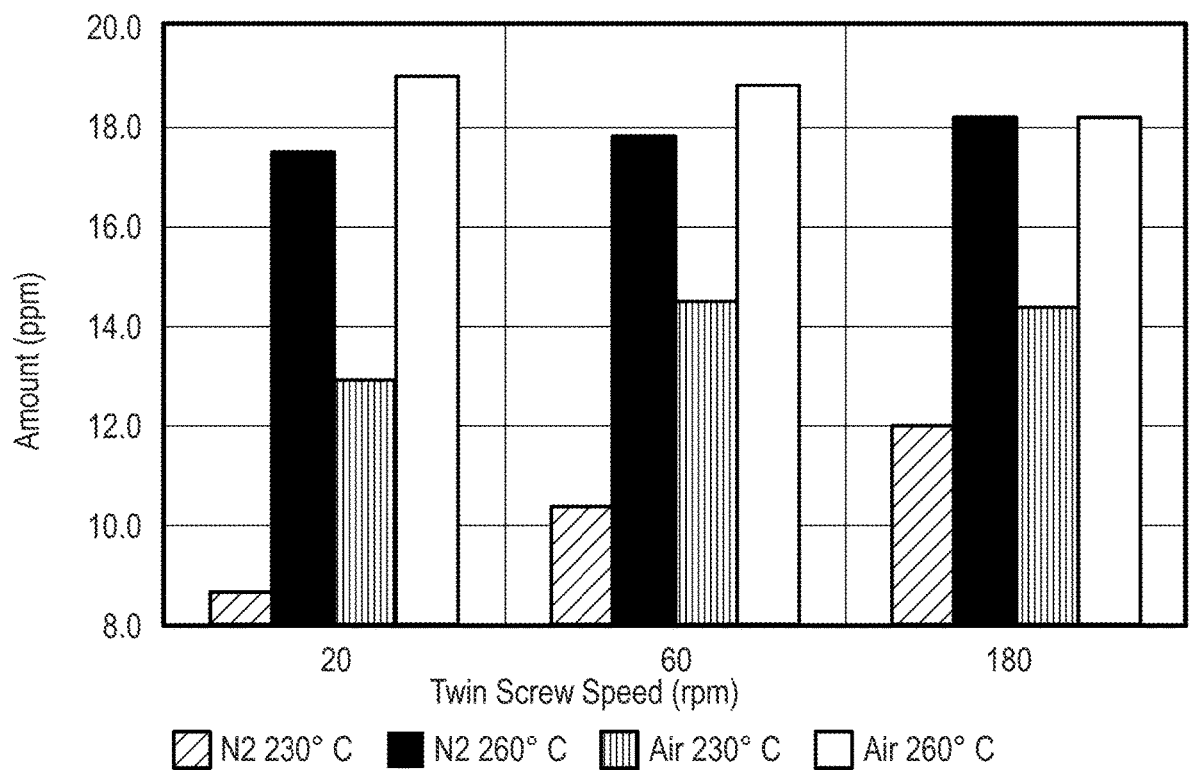
FIG. 6 shows allyl alcohol content in melt twin extruded PTF at 230 and 260° C. and 20, 60, and 180 rpm under nitrogen and air.
Figure 7:
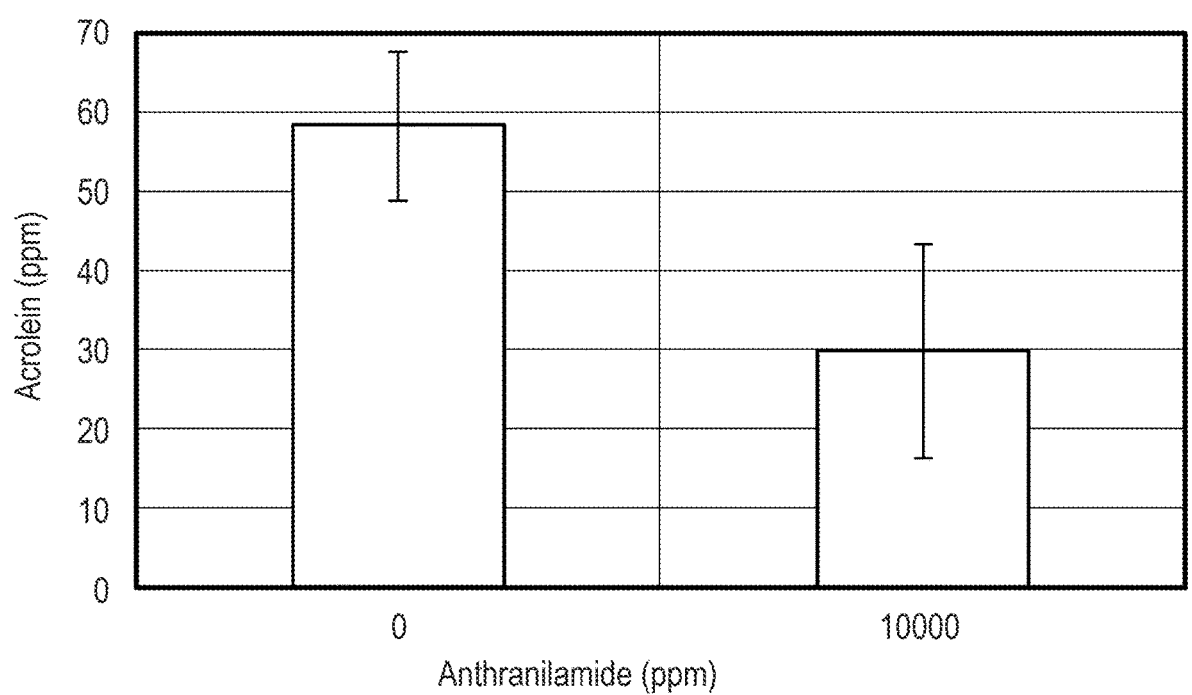
FIG. 7 shows acrolein content in melt twin extruded PTF compounded with 10000 ppm anthranilamide at 260° C. and 180 rpm under air.
Figure 8:
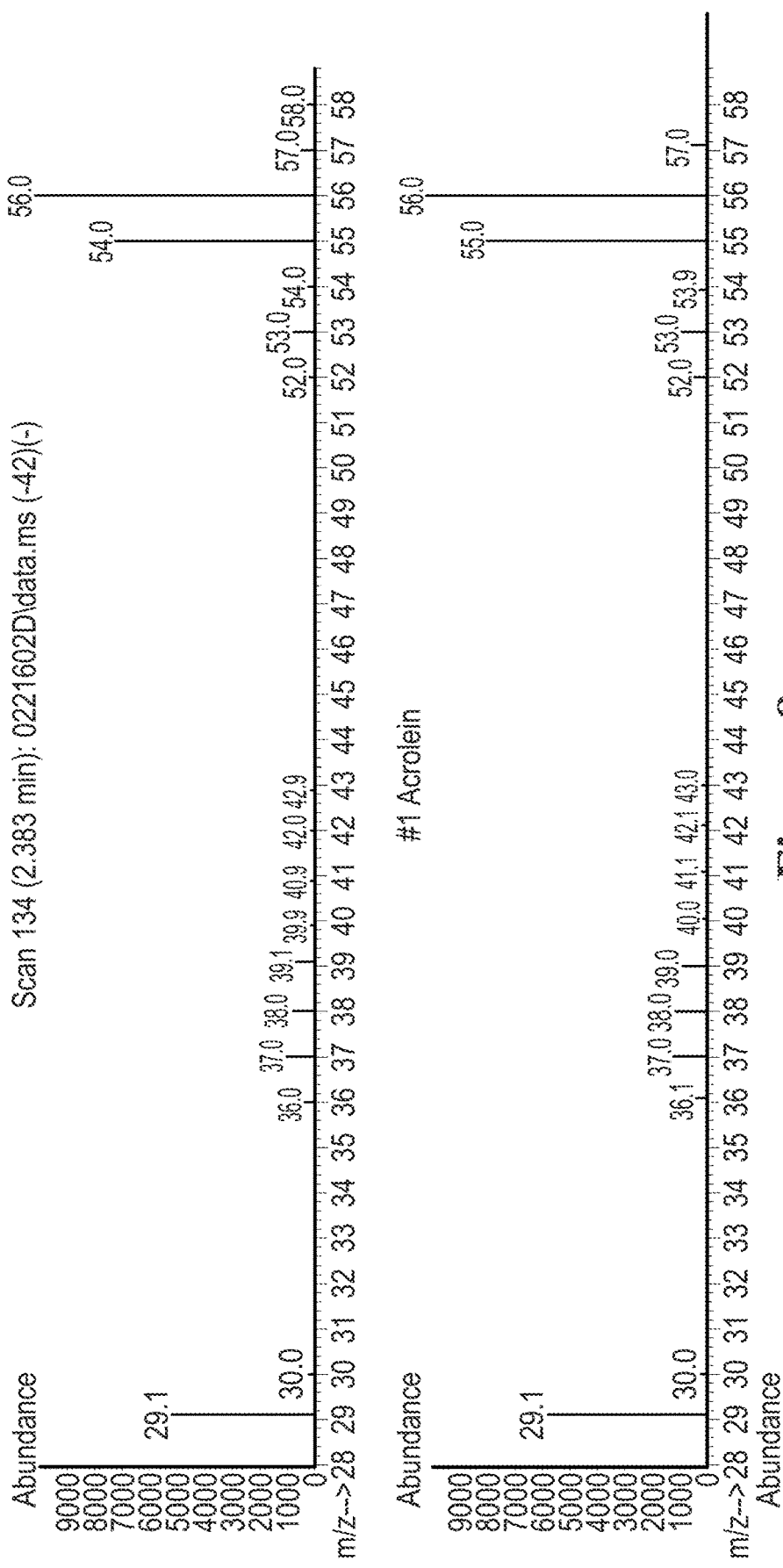
FIG. 8 presents mass spectra data of compound in PTF (top) and acrolein standard (bottom).
Figure 9:
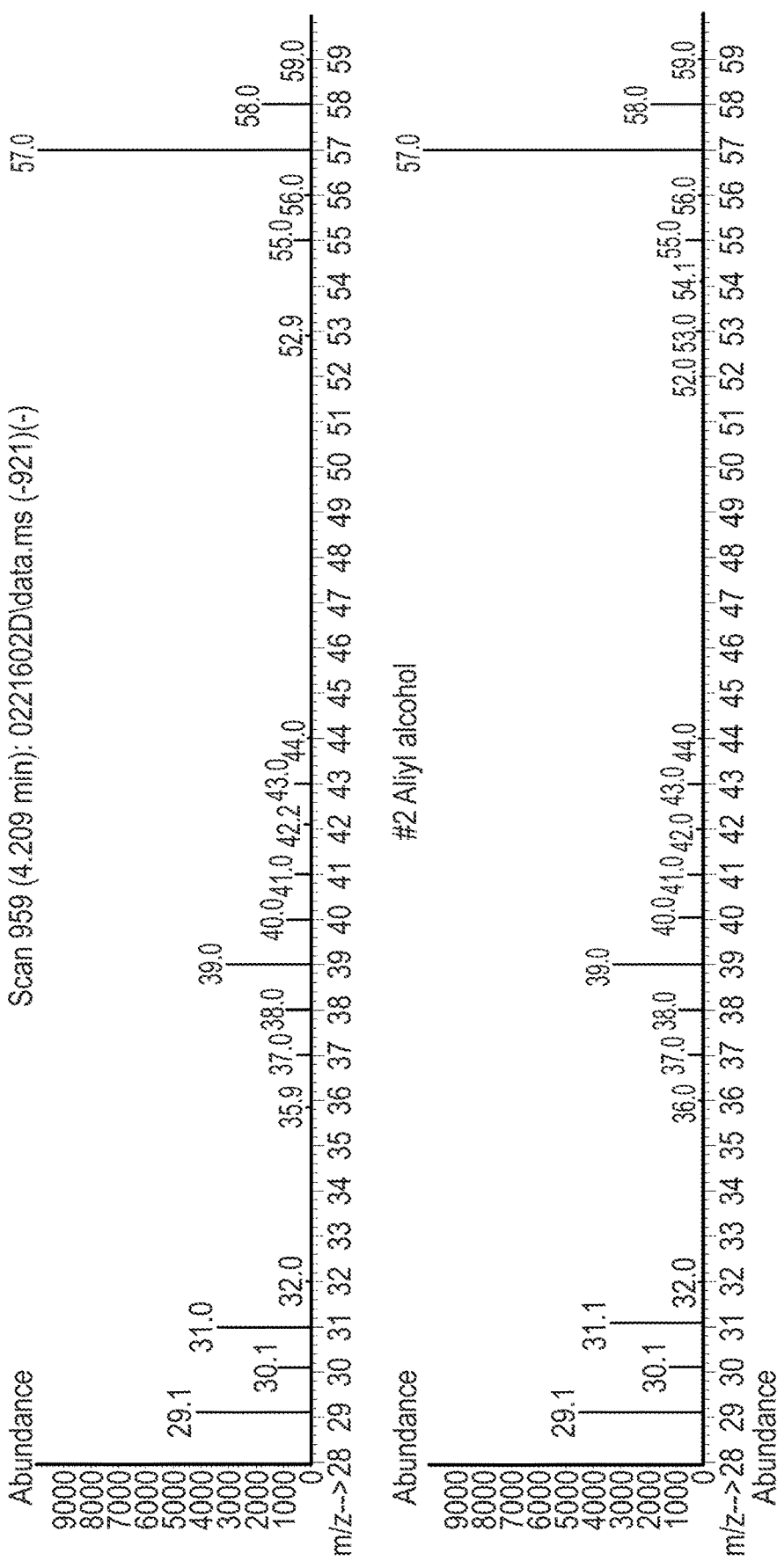
FIG. 9 presents mass spectra data of compound in PTF (top) and allyl alcohol standard (bottom).

FIG. 4 shows headspace GC/FID chromatogram overlay of melt twin extruded PTF at 260° C. and 180 rpm under air and acrolein/allyl alcohol mixed standard. Through retention time (RT) matching, the acrolein (RT 10.7 min) and allyl alcohol (RT 12.3 min) are confirmed in the PTF. As expected the acrolein elutes first having a boiling point of 53° C. compared to 97° C. for allyl alcohol. FIG. 5 and FIG. 6 show graphs of the acrolein and allyl alcohol content versus twin screw speed for melt extruded PTF at 230 and 260° C. under nitrogen and air. The acrolein content in PTF increases significantly at the higher temperature and twin screw speed, while the allyl alcohol content only has a slight increase at the higher processing temperature. The twin screw speed has little effect on increasing the amount of allyl alcohol. The melt extrusion atmosphere has little impact on the acrolein and allyl alcohol content. FIG. 7 shows the amount of acrolein in melt extruded PTF with and without anthranilamide compounded at 260° C. and 180 rpm under air. The addition of anthranilamide shows a decrease in the amount of acrolein. FIGS. 8 and 9 show the mass spectra of an acrolein and allyl alcohol standard compared with that of acrolein and allyl alcohol found in PTF further confirming the identity of the compounds.

We claim:

1. A process for decreasing the acrolein content in a polyester composition, the process comprising:
    combining a poly(trimethylene furan-2,5-dicarboxylate) (PTF) with an amino amide or a primary amine to form a polyester composition;
    wherein the amino amide or the primary amine is combined in an amount sufficient to scavenge acrolein produced from degradation of the polyester composition during melt-processing; and
    wherein the amino amide or the primary amine comprises:
        an α-amino amide;

a β-amino amide selected from 3-aminobutanamide, 3-aminopropanamide, 3-amino-2-methylbutanamide, 3-amino-2-phenylbutanamide, a substituted analog thereof, or any combination thereof; or a primary amine selected from methylamine, ethylamine, n-propylamine, isopropylamine, n-butylamine, isobutylamine, pentylamine, cyclohexyl amine, allyl amine, or any combination thereof.

2. The process according to claim 1, wherein combining the poly(trimethylene furan-2,5-dicarboxylate) (PTF) with the amino amide or the primary amine further comprises combining the amino amide or the primary amine in an amount sufficient to scavenge allyl alcohol produced from degradation of the polyester composition during melt-processing.

3. The process according to claim 1, wherein the amino amide or the primary amine is present in the polyester composition in a concentration of from 10 ppm to 10,000 ppm.

4. The process according to claim 1, wherein the amino amide or the primary amine is present in the polyester composition in a concentration of from 100 ppm to about 2,000 ppm.

5. The process according to claim 1, wherein the amino amide or the primary amine comprises the β-amino amide.

6. The process according to claim 1, wherein the amino amide or primary amine comprises the α-amino amide selected from a 2-aminoacetamide, a 2-aminopropanamide, a 2-alkyl-2-aminoacetamide, a 2-alkyl-2-aminopropanamide, a 2-aryl-2-aminoacetamide, a 2-aryl-2-aminopropanamide, a 2-benzyl-2-aminoacetamide, a 2-benzyl-2-aminopropanamide, a 2-(alkylamino)acetamide, a 2-(alkylamino)propanamide a 2-(arylamino)acetamide, a 2-(arylamino)propanamide, a 2-(benzylamino)acetamide, or a 2-(benzylamino)propanamide, a substituted analog thereof, or any combination thereof.

7. The process according to claim 1, wherein the amino amide or the primary amine is the primary amine.

8. The process according to claim 1, wherein the amino amide or the primary amine has a thermal decomposition temperature greater than about 250° C.

9. The process according to claim 1, wherein the combining step is carried out during the synthesis of the polyester composition from 1,3-propanediol and a diacid or a diester.

10. The process according to claim 1, wherein the combining step is carried out during thermal processing of the polyester composition.

11. The process according to claim 1, further comprising the step of fabricating the polyester composition into a film, a fiber, or a container.

12. A polyester composition comprising:
a poly(trimethylene furan-2,5-dicarboxylate) (PTF); and
an amino amide or a primary amine, present in an amount sufficient to scavenge acrolein produced from degradation of the polyester composition during melt-processing;
wherein the amino amide or the primary amine comprises:
an α-amino amide;
a β-amino amide selected from 3-aminobutanamide, 3-aminopropanamide, 3-amino-2-methylbutanamide, 3-amino-2-phenylbutanamide, a substituted analog thereof, or any combination thereof; or
a primary amine selected from methylamine, ethylamine, n-propylamine, isopropylamine, n-butylamine, isobutylamine, pentylamine, cyclohexyl amine, allyl amine, or any combination thereof.

13. The composition according to claim 12, wherein the amino amide or the primary amine are present in an amount sufficient to further scavenge allyl alcohol produced from degradation of the polyester composition during melt-processing.

14. The composition according to claim 12, wherein the amino amide or the primary amine is present in the polyester composition in a concentration of from 10 ppm to 10,000 ppm.

15. The composition according to claim 12, wherein the amino amide or the primary amine is present in the polyester composition in a concentration of from 100 ppm to about 2,000 ppm.

16. The composition according to claim 12, wherein the amino amide or primary amine comprises the β-amino amide.

17. The composition according to claim 12, wherein the amino amide or primary amine comprises the α-amino amide selected from a 2-aminoacetamide, a 2-aminopropanamide, a 2-alkyl-2-aminoacetamide, a 2-alkyl-2-aminopropanamide, a 2-aryl-2-aminoacetamide, a 2-aryl-2-aminopropanamide, a 2-benzyl-2-aminoacetamide, a 2-benzyl-2-aminopropanamide, a 2-(alkylamino)acetamide, a 2-(alkylamino)propanamide a 2-(arylamino)acetamide, a 2-(arylamino)propanamide, a 2-(benzylamino)acetamide, or a 2-(benzylamino)propanamide, a substituted analog thereof, or any combination thereof.

18. The composition according to claim 12, wherein the amino amide or primary amine is the primary amine.

19. The composition according to claim 12, wherein the amino amide or the primary amine has a thermal decomposition temperature greater than about 250° C.

20. The composition according to claim 12, wherein the combining step is carried out during the synthesis of the polyester composition from 1,3-propanediol and a diacid or a diester.

21. The composition according to claim 12, wherein the combining step is carried out during thermal processing of the polyester composition.

22. A film, a fiber, or a container comprising the polyester composition according to claim 12.

* * * * *